Patented Mar. 10, 1953

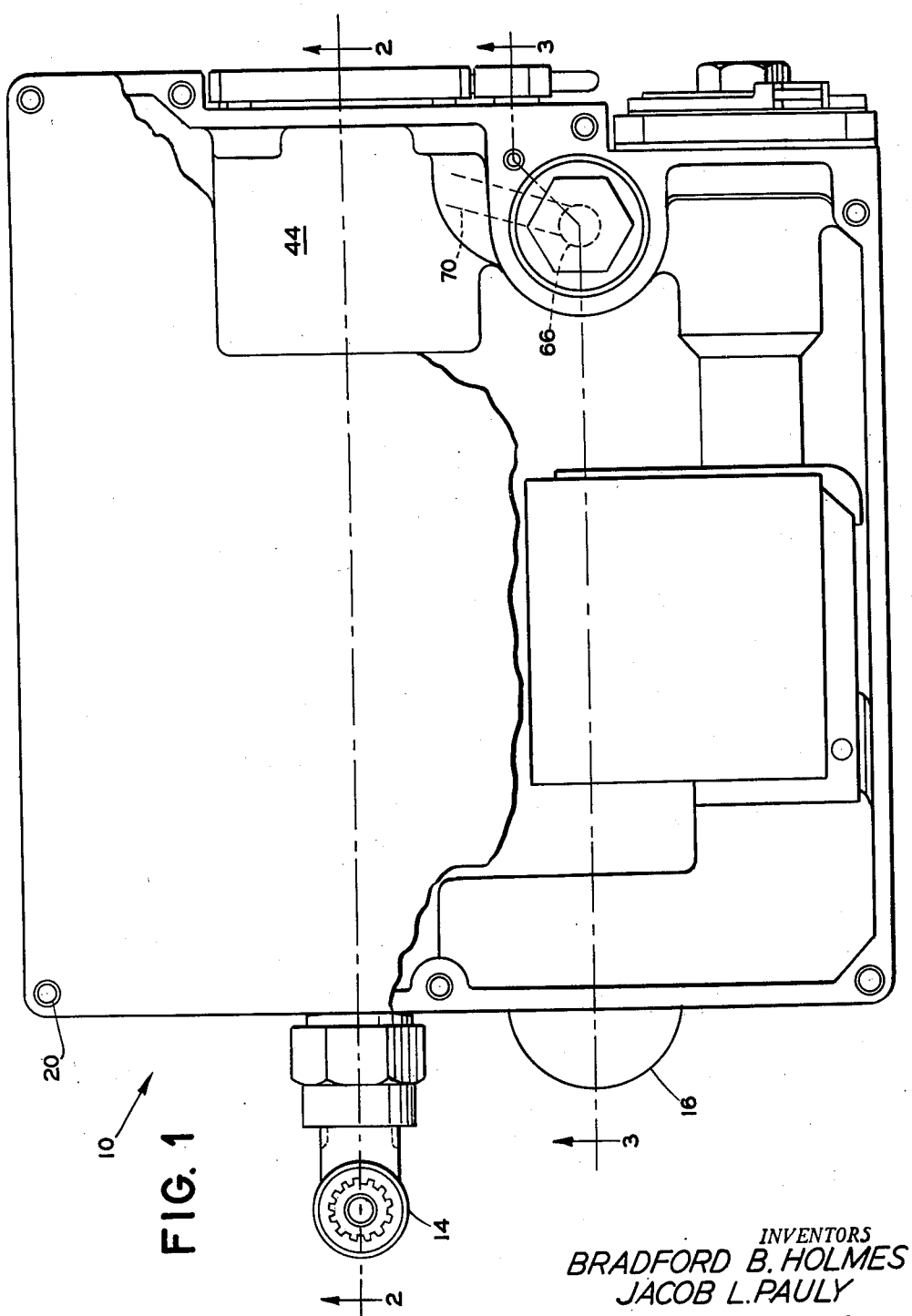

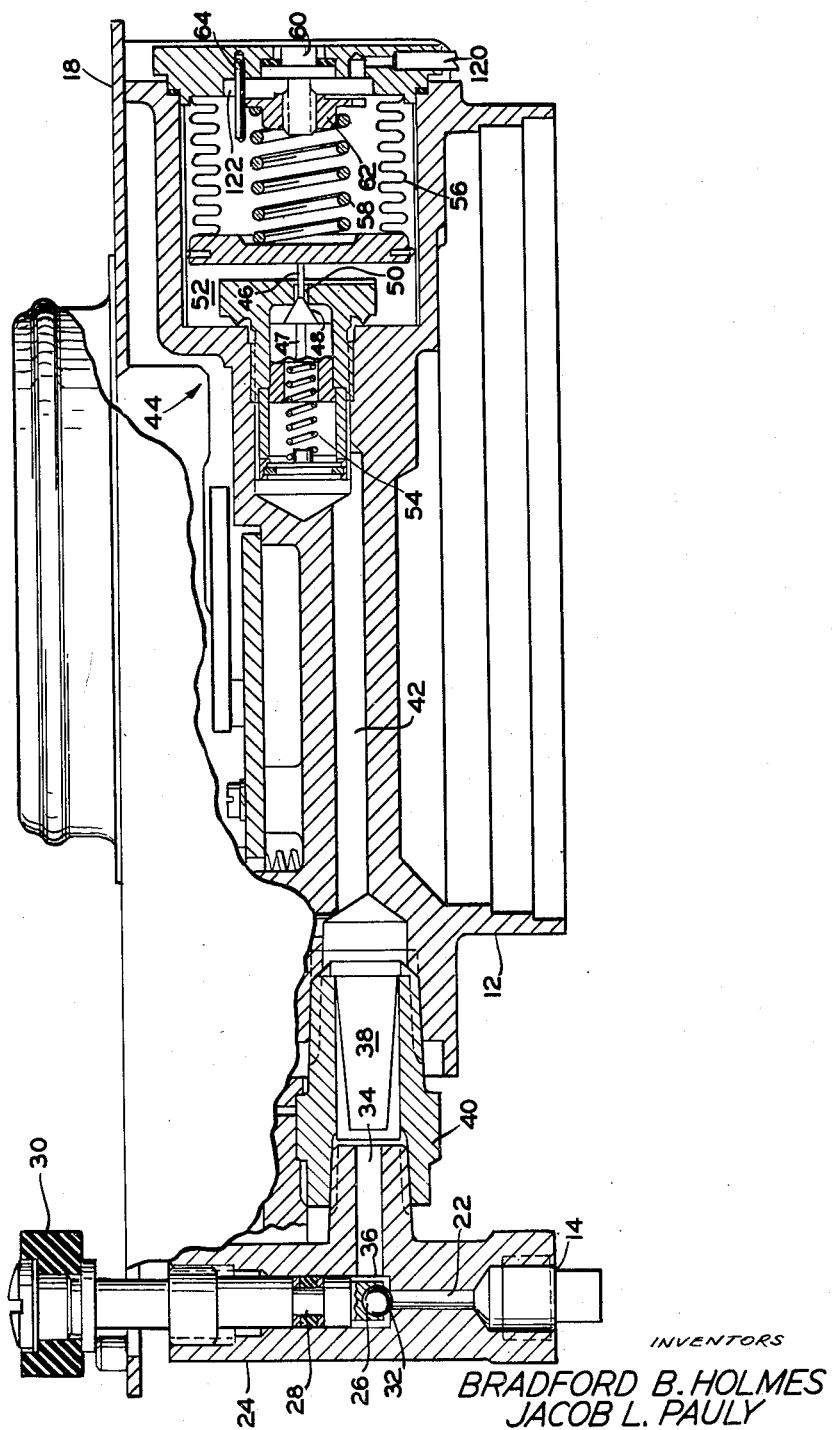

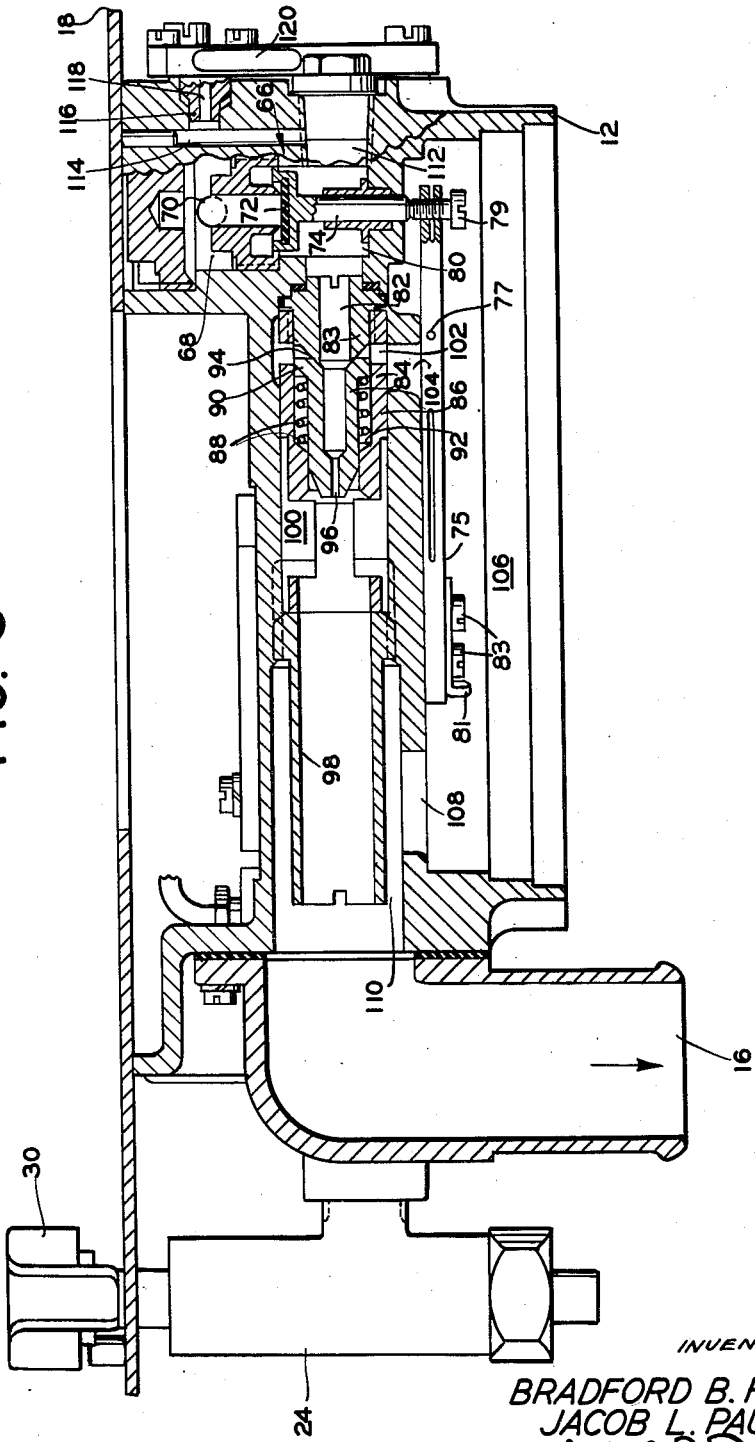

2,630,817

UNITED STATES PATENT OFFICE 2,630,817

INJECTOR NOZZLE BACK PRESSURE UTILIZATION MEANS

Jacob L. Pauly, Hackensack, N. J., and Bradford B. Holmes, New York, N. Y., assignors to Bendix Aviation Corporation, Teterboro, N. J., a corporation of Delaware Application May 12, 1950, Serial No. 161,601

13 Claims. (Cl. 137—64)

1

The present invention generally relates to pressure demand oxygen regulators and more particularly to means for regulating the pressure breathing pressure therein.

It is well known in the art that at altitudes above 40,000 feet, it is not possible to absorb oxygen at atmospheric pressure in sufficient quantity to maintain life. Therefore, means must be provided to supply oxygen under pressure to the lungs to prevent lowered oxygenation of the blood. Such means are called "pressure breathing."

Various types of oxygen supply systems have been devised in attempting to solve the herein disclosed problem of supplying the required oxygen at high altitudes. Of particular importance is the demand system which affords the greatest oxygen economy, and contemplates automatically providing the user with the proper amount of oxygen at various altitudes. The regulator for the demand system releases oxygen only in response to the diaphragm operated flow valve which is opened by the suction of the user's inhalations, and closes automatically when that suction ceases. The suction required of the user to operate the valve is approximately one quarter inch of water pressure. Since the oxygen supply is usually carried in "bottles" under pressure ranging from 500 to 2200 pounds per square inch, the oxygen pressure must first be reduced to a usable pressure. This is accomplished by a reducer valve integral with the regulator, which is opened and closed by means of a pressure responsive member within a reducing chamber.

The path of the oxygen flow is through an inlet valve, a pressure reducer, a demand valve, an injector and a Venturi section and out through an outlet fitting to the oxygen mask. The amount of oxygen that passes through the demand valve is controlled by the extent of inhalation by the user, the valve being entirely closed during exhalation.

Due to the supply of oxygen delivered to the mask by the operation of the demand valve, the pressure within the reducing chamber is decreased. When the pressure within the reducing chamber reaches a predetermined low pressure, the pressure responsive element contained therein will actuate the reducing valve to permit the oxygen under pressure to again enter the latter chamber. Upon an increase in the pressure in the chamber to the proper predetermined value, the reducing valve is again closed until the aforesaid cycle of operation is repeated.

It has been noted, however, that in regulators of this nature, the pressure breathing pressure drops when the flow through the injector increases. This latter effect is undesirable, especially at higher altitudes when it is essential to aid the breather by supplying oxygen under pressure to the lungs.

It is, therefore, one of the objects of the present invention to provide oxygen regulator means wherein the foregoing disadvantage is eliminated, and this desirable end is attained in a novel and effective manner.

Another object of the invention is to provide novel means within an oxygen regulator whereby the outlet pressure will be increased as the outlet flow increases at lower altitudes.

A further object of the invention is to provide novel means of the above indicated character whereby a substantially constant outlet pressure will be maintained at medium altitudes.

Another object is to provide novel oxygen regulator means whereby the outlet pressure will be substantially constant at high altitudes in a flow range from 10 to 100 liters per minute.

Still another object is to provide novel oxygen regulator means fulfilling the above described objects without the inclusion of additional parts to existing regulators.

A further object of the invention is to provide novel oxygen regulator means of the above indicated nature which shall be facile and economical to manufacture, positive and reliable in operation, and yet practical and efficient to a high degree in use.

The foregoing and other objects and advantages will appear more fully hereinafter from a consideration of the detailed description which follows, taken together with the accompanying drawings wherein one embodiment of the invention is illustrated by way of example. It is to be expressly understood, however, that the drawings are for the purpose of illustration only and are not to be construed as defining the limits of the invention.

Referring to the drawings, wherein like reference characters designate like parts throughout the several views, Figure 1 is a plan view of a novel pressure demand oxygen regulator assembly embodying the subject matter of the present invention.

Figure 2 is a section view taken substantially along the line 2—2 of Figure 1.

Figure 3 is a section view taken substantially along the line 3—3 of Figure 1.

Referring now to the drawings for a more detailed description of the present invention and more particularly to Figure 1 thereof, the numeral 10 generally indicates an oxygen regulator such as, for example, is disclosed in co-pending application Serial No. 60,585, filed November 17, 1948, on Demand Valve Control Mechanism, and assigned to the assignee of the present application.

A casing 12 includes an inlet 14 (Figures 1 and 2) and an outlet 16 (Figures 1 and 3) together with a mounting plate 18 adapted to be attached to an aircraft or other supporting structure. The plate 18 is secured to casing 12 by screws (not shown) in holes 20. The inlet 14 leads to a passageway 22 in a shut-off valve assembly 24. A ball valve 26 operable by a valve stem 28, is adapted, in response to turning of a valve knob 30, to completely shut off the inlet 22 by seating against a valve seat 32.

The passageway 22 normally is open to a second passageway 34 by means of a valve chamber 36. The second pasageway 34 leads through a porous filter 38, retained in a hexagonal fitting 40, which in turn communicates with a passage 42 leading directly to the pressure reducer valve generally designated with the reference character 44.

The pressure reducer valve 44 is of a type well known in the art and comprises a metal stem 46 pressed into a nylon valve 47 including a conical valve portion 48 which seats against and partially protrudes through an aperture 50 leading to the pressure reducer chamber 52. A spring 54 normally biases the valve 47 towards closed position. An expansible diaphragm 56 in chamber 52 is urged by a spring 58 against the stem 46 with tendency to unseat the conical portion 48 from its valve seat. The tension of spring 58 may be set as desired by means of an adjusting screw 60 and a collar 62 abutting the spring 58. A locking pin 64 prevents collar 62 from rotating away from its set position.

Referring now to Figure 3, a demand valve generally designated by the numeral 66 is fixed within a recess 68 of the casing 12. The valve 66 is associated with the pressure reducer chamber 52 by means of a passageway 70 (Figures 1 and 3). A rubber valve seat 72 on a stem 74 closes the valve. The valve seat 72 seals the oxygen inlet port 70 and prevents the oxygen from entering a chamber 80 formed within the recess 68.

The mechanism for operating the demand valve 66 in response to the requirements of the mask user forms no part of the instant invention and reference is made to the aforenoted co-pending application Serial No. 60,585 for a complete description of the construction and operation of a mechanism suitable to actuate the demand valve 66.

For purposes of describing the instant invention, the valve 66 is operated by a lever 75 that is pivoted as at 77 and which has an adjustment screw 79 threadedly received in one end thereof and a contact member 81 mounted by screws 83 to the other end thereof. A spring (not shown) operatively engaging the lever 75 between the pivot 77 and the contact member 81 tends to pivot lever 75 in a direction whereby the end of the screw 79 is brought into engagement with the end of the valve stem 74. The spring load imposed on the lever 75 is thereby made effective to hold the seat 72 in engagement with the valve against the pressure of the oxygen in the recess 68 to close the valve 66.

Contact member 81 is adapted to engage an actuating mechanism whereby the lever 75 is moved about pivot 77 in a direction against the bias of the spring load imposed thereon, to the end that the screw 79 is disengaged from the end of the valve stem 74 and the force exerted thereby on the valve stem 74 is relieved. The oxygen gas pressure in the recess 68 acting on the seat 72 will then open the valve 66.

As set forth in the above noted co-pending application Serial No. 60,585, the actuating mechanism is so designed and constructed that the opening of the valve 66 is made responsive to the needs of the mask user. Thus, if the mask user inhales deeply, the actuating mechanism rotates the lever 75 in a manner to open the valve 66 to permit a relatively high or large flow into the chamber 80. On the other hand, a shallow inhalation operates the lever 75, and thus valve 66, to permit only a relatively small delivery of oxygen to the chamber 80. Moreover, the actuating mechanism is also operative, upon an increase in altitude, to operate the valve 66 in a manner to establish safety and pressure-breathing pressures in the mask to the end that the proper amount of oxygen is made available to the mask user. When the valve 66 is open, oxygen enters the chamber 80 from the chamber 52 and flows through a passageway 82 in a plug 83 which leads into an injector nozzle 84. The injector nozzle 84 is slidably contained within a fixed bushing 86, and a spring 88 about the injector nozzle 84 and bearing against a flange 90 thereon, is anchored against an internal shoulder 92 in the bushing 86 so as to continuously bias the injector nozzle 84 against a seat 94 on the plug 83.

The injector nozzle 84 terminates in a reduced outlet 96 which discharges into a mixing tube 98 which, in turn, leads into the outlet 16. The mixing tube 98 communicates with a chamber 100 open to ambient atmosphere, so that as a stream of oxygen is discharged into the tube 98 from outlet 96 of the nozzle, a certain amount of ambient air will be drawn into the tube 98 dependent upon the velocity of the discharge stream from the outlet 96.

As hereinbefore set forth, the opening of the demand valve 66 is governed by the requirements of the mask user. It is apparent that when the demand valve 66 is actuated to provide a relatively large flow into the chamber 80, the restricted outlet 96 is not capable of fully accommodating this increased flow. Therefore, although flow through nozzle 84 increases, a back-pressure develops in the passageway 82 and chamber 80.

The plug 83 and the injector nozzle 84 normally contrive to close off an aperture 102 therebetween which communicates with a port 104 in the casing 12 which leads into a large chamber 106 from which a second port 108 communicates with a chamber 110 concentric with mixing tube 98 and thence to the outlet 16. It will, therefore, be apparent that upon the oxygen back-pressure attaining a predetermined value sufficient to overcome the spring 88, the injector nozzle 84 will be lifted off the seat 94 and oxygen will flow from the passageway 82 directly to the outlet 16 by-passing the mixing tube 98.

Referring again to pressure demand chamber 80 (Fig. 3), a passage 112 leads therefrom, and a conduit 114 from the passage 112 leads to a pressure adapter 116 having a conduit 118 formed therein. The conduit 118 leads into a tube 120 (Figures 2 and 3) which in turn leads to an aperture 122 (Figure 2) which communicates with the interior of the expansible diaphragm 56 of the pressure chamber.

Due to the foregoing arrangement, the back-pressure developed in chamber 80 is conducted into the interior of the expansible diaphragm 56 of the pressure reducer where it is effective to expand the bellows 56 against the pressure in the chamber 52. Thus, the back-pressure effectively assists the spring 58 in opening the valve 47 to permit a larger flow of oxygen, under a higher pressure into the chamber 52 where it is made available to the demand valve 66.

Having thus described the invention, it will now be apparent to those skilled in the art that when the inlet 14 is connected to a source of oxygen under high pressure, the gas will flow through the passage 22 past the ball valve 26, assuming the latter to be unseated, through the second passage 34 and the filter 38 into the passage 42 and thereafter through the reducer valve 44 into the reducer chamber 52.

The oxygen in the chamber 52 passes through the demand valve 66 in a quantity dependent upon the requirements of the breather, thereby lowering the pressure in the reducing chamber. The spring 58 thereupon expands the diaphragm 56 to the point where contact is made to open the stem 46 and admit oxygen under pressure into the chamber 52 whereupon the spring 58 is overcome and the diaphragm 56 is collapsed until the cycle is repeated.

The oxygen passes from the demand valve 66 into the chamber 80 and the passageway 82 to the injector nozzle 84. As the flow through the outlet 96 of the injector nozzle 84 increases, the pressure behind the nozzle in the passageway increases. This increased pressure, by means of passage 112, and conduits 114, 118 and 120 is led through the aperture 122 into the diaphragm 56 where it is exerted to expand the diaphragm, thereby aiding the spring 58. The pressure in the reduced chamber 52 will, therefore, be increased.

The effect of the foregoing will be to increase the outlet pressure as the outlet flow to the breather increases. The increase in outlet pressure with the increase in outlet flow will continue until the pressure behind the nozzle 84 attains a magnitude sufficient to overcome the spring 88 and unseat the nozzle, whereupon 100% oxygen will be delivered to the outlet 16 via aperture 102, port 104, chamber 106, port 108 and the concentric chamber 110.

In this manner, at high altitudes the pressure drop will be relatively small in a delivery range of from 10 to 100 liters per minute owing to the increased pressure in the reducer chamber 52.

The spring 88 is designed so that approximately 20 liters per minute of oxygen at sea level conditions will pass through the injector nozzle 84 before the spring is overcome to unseat the nozzle, and the pressure in the pressure reducer chamber 52 will increase accordingly. At altitudes above 38,000 feet where pressure breathing occurs, a volume of 10 to 20 sea level liters will have expanded to 100 liters at that altitude, the latter figure being the limit of human lung capacity, so that the maximum flow limit of 20 liters per minute permitted by the injector spring 88 will suffice to meet the highest possible breathing requirements at high altitudes. Therefore, at high altitudes the increasing pressure supplied to the chamber 52 by the inventive means disclosed herein, overcomes any pressure drop due to demand valve lift or turbulence or friction, and oxygen is delivered at substantially constant pressure to the outlet 16 over a flow range of 10 to 100 ambient liters.

It will thus be seen that there are provided novel means utilizing a boosting effect developed by the pressure build-up behind the injector nozzle of a demand regulator in which the several objects of this invention are achieved and which are well adapted to meet the conditions of practical use.

Although only one embodiment and one application of the invention has been illustrated and described, other changes and modifications in the form and relative arrangement of parts, which will be apparent to those skilled in the art, may be made without departing from the spirit and scope of the invention.

What is claimed is:

1. In a demand regulator having a casing including an outlet adapted for connection to a breathing mask, and an inlet adapted for connection to a source of respirant gas, a passageway in said casing communicating with said inlet, a manually operable ball valve for controlling communication between said inlet and said passageway, filter means in said passageway, a second passage communicating with said passageway, a pressure reducing chamber communicating with said second passage, a pressure reducing valve for controlling communication between said reducing chamber and said second passage, a diaphragm in said reducing chamber, spring means biasing said diaphragm to actuate said reducing valve to establish communication between said reducing chamber and said second passage, means exteriorly accessible of said casing for adjusting said spring means, a demand chamber communicating with said pressure reducing chamber, a demand valve for controlling communication between said reducing and demand chambers, an injector nozzle including a constriction therein, a passage leading from said demand chamber to said injector nozzle, said injector nozzle discharging respirant gas into said outlet, the constriction in said nozzle being effective upon the flow of respirant gas from said demand valve above a predetermined value to build up a back-pressure in said demand valve chamber, a conduit leading from said demand chamber, and passageway means connecting said conduit to one side of said diaphragm whereby the back-pressure developed by said injector nozzle cooperates with said spring to increase the pressure in said pressure reducing chamber upon an increase in gas flow through said nozzle.

2. In a demand regulator of the type including a casing having an inlet adapted for connection to a source of fluid under pressure and an outlet, a pressure reducer within said casing including a pressure reducing chamber, communicating with said inlet, a pressure reducing valve for regulating communication between said inlet and said pressure reducing chamber, a diaphragm movable within said pressure reducing chamber and having one side thereof exposed to pressure within said pressure reducing chamber for actuating said valve, yieldable means biasing said diaphragm to actuate said valve, a demand valve within said casing including a demand chamber communicating with said pressure reducing chamber, said demand valve controlling communication between said pressure reducing chamber and said demand chamber; a control system for controlling the flow and pressure of fluid from said demand chamber to said outlet comprising an injector nozzle communicating with said demand chamber and having a restricted opening therein for discharging fluid under pressure from said demand chamber into said outlet, the restricted opening in said nozzle having a lesser flow capacity than said demand valve whereby actuation of said demand valve to increase flow through said nozzle develops a back-pressure in said demand chamber, and passageway means connecting said demand chamber to said pressure reducing chamber whereby said back-pressure is effective on said movable diaphragm to assist said yieldable means in actuating said pressure reducing valve.

3. In a demand regulator having a casing including an inlet adapted for connection to a source of fluid pressure and an outlet, a pressure reducing chamber connected to said inlet, a pressure reducing valve normally closing communication between said inlet and said pressure reducing chamber, a diaphragm in said pressure reducing chamber, spring means biasing said diaphragm to open said pressure reducing valve, a pressure demand chamber connected with said pressure reducing chamber, a demand valve for controlling communication between said chambers, an injector nozzle communicating with said pressure demand chamber and having a restricted opening discharging into said outlet, the restricted opening in said nozzle being effective upon a flow of fluid pressure therethrough above a predetermined value to develop a back-pressure in said pressure demand chamber, and passageway means connecting said pressure demand chamber to one side of said diaphragm so as to increase the pressure in said pressure reducing chamber upon an increase in flow of fluid pressure through the restricted opening in said nozzle above said predetermined value.

4. In an oxygen demand regulator having a casing provided with an inlet and an outlet, a pressure reducing chamber connected with said inlet, a pressure reducing valve for opening and closing communication between said inlet and said pressure reducing chamber, a spring pressed diaphragm for controlling said pressure reducing valve, a demand chamber connected with said pressure reducing chamber, a demand valve for opening and closing communication between said pressure reducing chamber and said demand chamber, a nozzle communicating with said demand chamber and having a restricted opening discharging into said outlet, said nozzle being effective upon flow through the restricted opening thereof to develop a back-pressure in said nozzle that varies with flow through said nozzle above a predetermined flow, and means communicating said back-pressure to said spring pressed diaphragm to supplement the control of said pressure reducing valve by said spring pressed diaphragm.

5. In an oxygen demand regulator having a casing provided with an inlet and an outlet together with a diaphragm operated reducing valve controlling the inlet, an injector having an outlet discharging into the regulator outlet, and a demand valve passing oxygen admitted by the reducing valve to the inlet of an injector nozzle, the improvement comprising means connecting said nozzle inlet to one side of said diaphragm whereby pressure in said nozzle inlet is effective to expand said diaphragm to aid the diaphragm in opening the reducing valve.

6. In an oxygen demand regulator having a casing provided with an inlet and an outlet together with a pressure responsive reducing valve controlling the inlet, an injector nozzle having an outlet discharging into the regulator outlet, and a demand valve passing oxygen admitted by the reducing valve to the inlet of the injector nozzle, the combination with said pressure responsive valve of a boost control therefor comprising passageway means connecting said nozzle inlet to said pressure responsive valve whereby pressure in said nozzle inlet affects the operation of said reducing valve.

7. An oxygen demand regulator comprising a casing including an inlet and an outlet, a reducing chamber, a pressure responsive reducing valve responsive to pressure in said reducing chamber for controlling communication between said inlet and reducing chamber, a demand chamber, a demand valve for controlling communication between said reducing and demand chambers, a discharge nozzle having an inlet communicating with said demand chamber and a restricted opening therein for developing a back-pressure at the inlet of said nozzle varying with oxygen flow from said demand chamber, and means for communicating the back-pressure from said nozzle inlet to said pressure responsive reducing valve whereby said pressure responsive reducing valve is actuated to increase the oxygen pressure in said reducing chamber.

8. An oxygen regulator comprising a casing having an inlet and an outlet, a reducing chamber, a pressure responsive valve responsive to pressure in said reducing chamber for controlling communication between said inlet and said reducing chamber, a demand chamber, a demand valve controlling communication betwen said reducing and demand chambers, an injector nozzle having an inlet communicating with said demand chamber and a restricted opening discharging into said outlet for developing at its input a back-pressure varying with oxygen flow from said demand chamber, and conduit means communicating the back-pressure from said nozzle inlet to said pressure responsive reducing valve whereby said pressure responsive reducing valve is operated to increase the oxygen pressure in said reducing chamber.

9. An oxygen regulator comprising a casing having an inlet and an outlet, a reducing chamber, a reducing valve operable in response to oxygen pressure in said reducing chamber for controlling communication between said inlet and said reducing chamber, a demand valve releasing oxygen from said reducing chamber, an injector nozzle receiving said released oxygen and having a restricted opening therein for developing a back-pressure as a function of increased oxygen flow therethrough, and means communicating the back-pressure developed by said nozzle to said reducing valve whereby said reducing valve is operated to increase the oxygen pressure in said reducing chamber.

10. In a demand regulator of the type including a casing having an inlet adapted for connection to a source of fluid under pressure and an outlet, and a demand valve including a demand chamber within said casing for controlling the flow of fluid under pressure from said inlet to said outlet, a control mechanism for controlling the flow and pressure of fluid from said inlet to said demand valve and from said demand valve to said outlet comprising a pressure reducing chamber in said casing communicating with said inlet, a pressure reducing valve regulating communication between said inlet and said pressure reducing chamber, a diaphragm movable within said pressure reducing chamber and having one side thereof exposed to pressure in said pressure reducing pressure for actuating said pressure reducing valve, yieldable means biasing said diaphragm to actuate said pressure reducing valve, said pressure reducing chamber communicating with said demand valve whereby the actuation of said demand valve communicates the pressure reducing chamber to the demand chamber of said demand valve, an injector nozzle communicating with said demand chamber and having a restricted opening therein for discharging fluid under pressure from said demand chamber into said outlet, the restricted opening in said nozzle having a lesser flow capacity than said demand valve whereby actuation of said demand valve to increase flow through said nozzle develops a back-pressure in said demand chamber, and passageway means connecting said demand chamber to said pressure reducing chamber whereby said back-pressure is effective on said movable diaphragm to assist said yieldable means in actuating said pressure reducing valve.

11. In an oxygen demand regulator having a casing provided with an inlet and an outlet, a diaphragm actuated reducing valve controlling said inlet, a demand chamber, a demand valve operative to pass oxygen admitted by said reducing valve to said demand chamber, a passageway communicating said demand chamber to said outlet and a mixing chamber in said passageway; a control system for controlling flow between said demand chamber and said outlet comprising a bushing fixedly secured in said passageway between said demand and mixing chambers, a hollow plug mounted in said bushing adjacent said demand chamber and having an inlet at one end thereof opening into said demand chamber, a seat at the other end of said plug, registered ports in said bushing and the wall of said passageway communicating with the interior of said bushing adjacent the seat of said plug, an injector nozzle slidably mounted in said bushing and adapted at one end thereof to engage said seat and having a restricted opening at the other end thereof discharging into said mixing chamber, resilient means biasing said nozzle into engagement with said seat, said nozzle being effective to close said registered ports when engaged with said seat, a second port in the wall of said passageway adjacent said outlet, and means communicating said registered ports with said second port, the restricted opening in said nozzle being effective upon a flow therethrough in excess of a predetermined value to develop a back-pressure in said nozzle and plug whereby said nozzle is moved against the bias of said resilient means away from said seat and to open said registered ports to thereby permit flow from said registered ports through second port to said outlet.

12. In an oxygen demand regulator having a casing provided with an inlet and an outlet, a diaphragm actuated reducing valve controlling said inlet, a demand chamber, a demand valve operative to pass oxygen admitted by said reducing valve to said demand chamber, a passageway communicating said demand chamber to said outlet; a control system for controlling flow between said demand chamber and said outlet comprising a valve member mounted in said passageway and having an inlet communicating with said demand chamber and an outlet, a first port in the wall of said passageway adjacent the outlet of said valve member, an injector nozzle slidably mounted in said passageway and adapted at one end thereof to engage the outlet of said valve member and having a restricted opening at the other end thereof discharging into said passageway, spring means biasing said injector nozzle into engagement with the outlet of said valve member whereby communication between the outlet in said valve member and said first port is closed, a second portion the wall of said passageway adjacent to and communicating with said outlet, and means communicating said first and second ports, the restricted opening in said injector nozzle being effective upon a flow therethrough in excess of a predetermined value to develop a back-pressure in said injector nozzle and valve member whereby said injector nozzle is moved out of engagement with the outlet of said valve member and said first port is opened to thereby permit flow between the outlet in said valve member and said outlet independently of flow through said injector nozzle.

13. In an oxygen demand regulator having a casing provided with an inlet and an outlet, a diaphragm actuated reducing valve controlling said inlet, a demand chamber, a demand valve operative to pass oxygen admitted by said reducing valve to said demand chamber, a passageway communicating said demand chamber to said outlet; a control system for controlling flow between said demand chamber and said outlet comprising a valve member mounted in said passageway and having an inlet communicating with said demand chamber and an outlet, a port in the wall of said passageway adjacent to and communicating with the outlet in said valve member, an injector nozzle slidably mounted in said passageway and adapted at one end thereof to engage the outlet of said valve member to thereby close communication between the outlet in said valve member and said port, and having a restricted opening in the other end thereof discharging into said passageway, and spring means biasing said injector nozzle into engagement with the outlet of said valve member the restricted opening in said injector nozzle being effective upon a flow therethrough in excess of a predetermined value to develop a back-pressure in said injector nozzle and valve member whereby said injector is disengaged from the outlet in said valve member to establish flow between the outlet in said valve member and said port.

JACOB L. PAULY.
BRADFORD B. HOLMES.

REFERENCES CITED

The following references are of record in the file of this patent:

UNITED STATES PATENTS

| Number | Name | Date |
|---|---|---|
| 1,848,232 | Swope et al. | Mar. 8, 1932 |
| 2,384,669 | Fields | Sept. 11, 1945 |
| 2,437,462 | Frye et al. | Mar. 9, 1948 |
| 2,452,670 | Meidenbauer | Nov. 2, 1948 |